US011354509B2

(12) United States Patent
Hermann et al.

(10) Patent No.: US 11,354,509 B2
(45) Date of Patent: Jun. 7, 2022

(54) ACTION SELECTION BASED ON ENVIRONMENT OBSERVATIONS AND TEXTUAL INSTRUCTIONS

(71) Applicant: DeepMind Technologies Limited, London (GB)

(72) Inventors: Karl Moritz Hermann, London (GB); Philip Blunsom, London (GB); Felix George Hill, London (GB)

(73) Assignee: DeepMind Technologies Limited, London (GB)

(*) Notice: Subject to any disclaimer, the term of this patent is extended or adjusted under 35 U.S.C. 154(b) by 441 days.

(21) Appl. No.: 16/497,602

(22) PCT Filed: Jun. 5, 2018

(86) PCT No.: PCT/EP2018/064703
§ 371 (c)(1),
(2) Date: Sep. 25, 2019

(87) PCT Pub. No.: WO2018/224471
PCT Pub. Date: Dec. 13, 2018

(65) Prior Publication Data
US 2021/0110115 A1  Apr. 15, 2021

Related U.S. Application Data

(60) Provisional application No. 62/515,458, filed on Jun. 5, 2017.

(51) Int. Cl.
G06F 40/30 (2020.01)
G06F 17/16 (2006.01)
G06N 3/08 (2006.01)

(52) U.S. Cl.
CPC ............. *G06F 40/30* (2020.01); *G06F 17/16* (2013.01); *G06N 3/08* (2013.01)

(58) Field of Classification Search
CPC ........... G06F 40/30; G06F 17/16; G06N 3/08
See application file for complete search history.

(56) References Cited

U.S. PATENT DOCUMENTS 5,680,557 A * 10/1997 Karamchetty ............ G06F 8/34
715/765
5,963,966 A * 10/1999 Mitchell ................ G06V 30/40
715/236

(Continued)

FOREIGN PATENT DOCUMENTS

WO    WO 2018224471    12/2018

OTHER PUBLICATIONS

Arumugam et al., "Accurately and efficiently interpreting human-robot instructions of varying granularities," arXiv, Jun. 2018, 10 pages.

(Continued)

Primary Examiner — Kevin Ky
(74) Attorney, Agent, or Firm — Fish & Richardson P.C.

(57) ABSTRACT

Methods, systems, and apparatus, including computer programs encoded on a computer storage medium, for selecting actions to be performed by an agent interacting with an environment. In one aspect, a system includes a language encoder model that is configured to receive a text string in a particular natural language, and process the text string to generate a text embedding of the text string. The system includes an observation encoder neural network that is configured to receive an observation characterizing a state of the environment, and process the observation to generate an observation embedding of the observation. The system includes a subsystem that is configured to obtain a current text embedding of a current text string and a current observation embedding of a current observation. The subsystem is (Continued)

configured to select an action to be performed by the agent in response to the current observation.

28 Claims, 5 Drawing Sheets

(56) References Cited

U.S. PATENT DOCUMENTS

| | | | | |
|---|---|---|---|---|
| 10,645,073 | B1* | 5/2020 | Agarmore | G06F 21/44 |
| 2012/0044250 | A1* | 2/2012 | Landers | H04N 21/858 |
| | | | | 345/473 |
| 2013/0145241 | A1* | 6/2013 | Salama | G06F 16/94 |
| | | | | 715/202 |
| 2017/0124432 | A1* | 5/2017 | Chen | G06K 9/6267 |
| 2017/0372696 | A1* | 12/2017 | Lee | G10L 15/063 |
| 2018/0061074 | A1* | 3/2018 | Yamamichi | G06V 30/40 |
| 2018/0129742 | A1* | 5/2018 | Li | G06V 20/52 |
| 2018/0129938 | A1* | 5/2018 | Xiong | G06N 5/022 |
| 2018/0329887 | A1* | 11/2018 | Bull | G06F 40/30 |
| 2021/0110115 | A1* | 4/2021 | Hermann | G06F 40/30 |
| 2021/0390270 | A1* | 12/2021 | Fei | G06F 40/197 |
| 2022/0020355 | A1* | 1/2022 | Ming | G10L 13/08 |

OTHER PUBLICATIONS

Beattie et al., "DeepMindLab," arXiv, Dec. 2016, 11 pages.
Berant et al., "Semantic Parsing on Freebase from Question-Answer Pairs," Proceedings of the 2013 Conference on Empirical Methods in Natural Language Processing, Oct. 2013, 12 pages.
Chen et al., "Learning to Sportscast: A Test of Grounded Language Acquisition," Proceedings of the 25th international conference on Machine learning, Jul. 2008, 8 pages.
Chomsky, "A review of BF Skinner's Verbal Behavior," Readings in philosophy of psychology 1, 1980, 29 pages.
De Anda et al., "Lexical access in the second year: a cross-linguistic study of monolingual and bilingual vocabulary development," San Diego Linguistic Papers 6 (2016), 2016, 16 pages.
Doumas et al., "A Theory of the Discovery and Predication of Relational Concepts," Psychological review 115, Jan. 2008, 43 pages.
Fernald et al., "Blue car, red car: Developing efficiency in online interpretation of adjective-noun phrases," Cognitive psychology 60.3 (2010), May 2010, 34 pages.
Frank et al., "Social and discourse contributions to the determination of reference in cross-situational word learning," Language Learning and Development 9.1 (2013), Jan. 2013, 24 pages.
Harnad, "The symbol grounding problem," Physica D: Nonlinear Phenomena 42, 12 pages.
Hemachandra et al., "Learning Spatial-Semantic Representations from Natural Language Descriptions and Scene Classifications," 2014 IEEE International Conference on Robotics and Automation (ICRA), May 2014, 8 pages.
Hermann et al., "Grounded Language Learning in a Simulated 3D World," arXiv, Jun. 2017, 22 pages.
Hochreiter et al., "Long short-term memoiy," Neural computation, Nov. 1997, 32 pages.
Jaderberg et al., "Reinforcement Learning with Unsupervised Auxiliary Tasks," arXiv, Nov. 2016, 14 pages.
Kaplan et al., "Beating atari with natural language guided reinforcement learning," arXiv, Apr. 2017, 13 pages.
Krening et al., "Learning from explanations using sentiment and advice in RL," IEEE Transactions on Cognitive and Developmental Systems 9.1, Nov. 2016, 12 pages.
Krizhevsky et al., "ImageNet Classification with Deep Convolutional Neural Networks," Advances in neural information processing systems, Dec. 2012, 9 pages.
LeCun et al., "Backpropagation applied to handwritten zip code recognition," Neural computation, Dec. 1989, 11 pages.

McClelland et al, "The appeal of parallel distributed processing," IEEE, 1988, 1:43 pages.
McMurray, "Defusing the childhood vocabulary explosion," Science 317.5838 (2007), Aug. 2007, 1 page.
Mikolov et al., "A roadmap towards machine intelligence," arXiv, Feb. 2016, 36 pages.
Mirowski et al., "Learning to Navigate in Complex Environments," arXiv, Jan. 2017, 16 pages.
Mnih et al., "Asynchronous methods for deep reinforcement learning," International conference on machine learning, Jun. 2016, 10 pages.
Mnih et al., "Human-level control through deep reinforcement learning," Nature 518, Feb. 2015, 13 pages.
Narasimhan et al., "Language understanding for text-based games using deep reinforcement learning," arXiv, Sep. 2015, 11 pages.
Oh et al., "Action-Conditional Video Prediction using Deep Networks in Atari Games," arXiv, Dec. 2015, 26 pages.
PCT International Preliminary Report on Patentability in International Appln. No. PCT/EP2018/064703, dated Dec. 10, 2019, 16 pages.
PCT International Search Report and Written Opinion in International Appln. No. PCT/EP2018/06470, dated Sep. 7, 2018, 22 pages.
Plunkett, "Lexical segmentation and vocabulary growth in early language acquisition," Journal of Child Language 20.1, Feb. 1993, 18 pages.
Poulin-Dubois et al., "Lexical access and vocabulary development in very young bilinguals," International Journal of Bilingualism, Feb. 2013, 17(1):57-70.
Quinn et al., "Evidence for representations of perceptually similar natural categories by 3-month-old and 4-month-old infants," Perception, Apr. 1993, 22:463-475.
Rowe, "Child-directed speech: Relation to socioeconomic status, knowledge of child development and child vocabulary skill," Journal of child language 35.1 (2008), Feb. 2008, 22 pages.
Roy et al., "Learning words from sights and sounds: A computational model," Cognitive science, Jan. 2002, 113-146.
Searle, "Minds, brains, and programs," Behavioral and brain sciences 3.3 (1980), Sep. 1980, 19 pages.
Shelhamer et al., "Loss is its own Reward: Self-Supervision for Reinforcement Learning," arXiv, Mar. 2017, 9 pages.
Silberer et al., "Grounded models of semantic representation," Proceedings of the 2012 Joint Conference on Empirical Methods in Natural Language Processing and Computational Natural Language Learning, Jul. 2012, 1423-1433.
Siskind, "Grounding Language in Perception," Artificial Intelligence Review, Sep. 1994, 21 pages.
Siskind, "Grounding the lexical semantics of verbs in visual perception using force dynamics and event logic," Journal of artificial intelligence research 15, Aug. 2001, 31-90.
Smith et al., "Infants rapidly learn word-referent mappings via cross-situational statistics," Cognition 106.3 (2008), Mar. 2008, 12 pages.
Smith et al., "Naming in young children: A dumb attentional mechanism?" Cognition 60, Aug. 1996, 29 pages.
Steels, "The symbol grounding problem has been solved, so what's next," Symbols and embodiment: Debates on meaning and cognition, Aug. 2007, 21 pages.
Thomason et al., "Learning to interpret natural language commands through human-robot dialog," Twenty-Fourth International Joint Conference on Artificial Intelligence, Jun. 2015, 1923-1929.
Vendrov et al., "Order-embeddings of images and language," arXiv, Mar. 2016, 12 pages.
Vosniadou et al., "Mental models of the earth: A study of conceptual change in childhood," Cognitive psychology 24, Oct. 1992, 535-585.
Walter et al., "A framework for learning semantic maps from grounded natural language descriptions," International Journal of Robotics Research 33.9, Aug. 2014, 23 pages.
Wang et al., "Learning language games through interaction," arXiv, Jun. 2016, 11 pages.
Weisleder et al., "Talking to children matters: Early language experience strengthens processing and builds vocabulary," Psychological science 24.11 (2013), Nov. 2013, 14 pages.

(56) References Cited

OTHER PUBLICATIONS

Winograd, "Understanding natural language," Cognitive psychology 3.1 (1972), Jan. 1972, 191 pages.
Xu et al., "Show, attend and tell: Neural image caption generation with visual attention," International conference on machine learning, Jun. 2015, 10 pages.
Yu et al., "A Deep Compositional Framework for Human-like Language Acquisition in Virtual Environment," arXiv, May 2017, 16 pages.
Yu et al., "Grounded language learning from video described with sentences," Proceedings of the 51st Annual Meeting of the Association for Computational Linguistics (vol. 1: Long Papers), Aug. 2013, 11 pages.
Zettlemoyer et al., "Learning to map sentences to logical form: Structured classification with probabilistic categorial grammars," arXiv, Jul. 2012, 9 pages.
Office Action in European Appln. No. 18729406.1, dated Jun. 30, 2021, 13 pages.

* cited by examiner

ACTION SELECTION BASED ON ENVIRONMENT OBSERVATIONS AND TEXTUAL INSTRUCTIONS

CROSS-REFERENCE TO RELATED APPLICATION

This application is a National Stage Application under 35 U.S.C. § 371 and claims the benefit of International Application No. PCT/EP2018/064703, filed Jun. 5, 2018, which claims priority to U.S. Application No. 62/515,458, filed Jun. 5, 2017. The disclosure of the foregoing application is hereby incorporated by reference in its entirety.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that selects actions to be performed by a reinforcement learning agent interacting with an environment.

According to a first aspect there is provided a system for selecting actions to be performed by an agent interacting with an environment, the system including one or more computers and one or more storage devices storing instructions. When the instructions are executed by the one or more computers, they cause the one or more computers to implement a language encoder model, an observation encoder neural network, and a subsystem.

The language encoder model is configured to receive an input text string in a particular natural language, and process the input text string to generate a text embedding of the input text string. The observation encoder neural network is configured to receive an input observation characterizing a state of the environment, and process the input observation to generate an observation embedding of the input observation. The subsystem is configured to receive a current text string in the particular natural language that expresses information about a current task currently being performed by the agent. The subsystem provides the current text string as input to the language encoder model to obtain a current text embedding of the current text string. The subsystem receives a current observation characterizing a current state of the environment. The subsystem provides the current observation as input to the observation encoder neural network to obtain a current observation embedding of the current observation. The subsystem combines the current observation embedding and the current text embedding to generate a current combined embedding. The subsystem selects, using the current combined embedding, an action to be performed by the agent in response to the current observation.

In some implementations, the instructions further cause the one or more computers to implement an action selection neural network. The action selection neural network is configured to receive an input combined embedding, and process the input combined embedding to generate an action selection output.

In some implementations, selecting, using the current combined embedding, an action to be performed by the agent in response to the current observation includes providing the current combined embedding as input to the action selection neural network to obtain a current action selection output. The action to be performed by the agent in response to the current observation is selected using the current action selection output.

In some implementations, the current action selection output defines a probability distribution over possible actions to be performed by the agent. Selecting the action to be performed by the agent includes sampling an action from the probability distribution or selecting an action having a highest probability according the probability distribution.

In some implementations, the current action selection output includes, for each of multiple possible actions to be performed by the agent, a respective Q value that is an estimate of a return resulting from the agent performing the possible action in response to the current observation. Selecting the action to be performed by the agent includes selecting an action having a highest Q value.

In some implementations, the current action selection output identifies a best possible action to be performed by the agent in response to the current observation, and selecting the action to be performed by the agent includes selecting the best possible action.

In some implementations, the language encoder model is a recurrent neural network.

In some implementations, the language encoder model is a bag-of-words encoder.

In some implementations, the current text string is a natural language instruction for the agent for performing the current task.

In some implementations, the current observation embedding is a feature matrix of the current observation, and wherein the current text embedding is a feature vector of the current text string.

In some implementations, combining the current observation embedding and the current text embedding includes flattening the feature matrix of the current observation and concatenating the flattened feature matrix and the feature vector of the current text string.

In some implementations, the current text string is the same for each observation received during the performance of the current task.

In some implementations, the current text string is different from a preceding text string received during the performance of the current task.

According to a second aspect, there is provided a method of training the language encoder model, the observation encoder neural network and the action selection neural network. The method includes receiving a current reward as a result of the agent performing the current action in response to the current observation. A task-specific update to current values of parameters of the action selection neural network is determined by performing an iteration of a machine learning training technique to optimize a task-specific objective that is based on the current reward. A task-specific update to current values of parameters of the language encoder model and the observation encoder neural network is determined by backpropagating gradients of the task-specific objective through the action selection neural network and into the language encoder model and the observation encoder neural network.

In some implementations, the task-specific objective is to maximize a time-discounted expected return received in response to actions performed by the agent during performance of the current task. Performing the iteration of the machine learning training technique includes performing an iteration of a reinforcement learning technique to optimize the task-specific objective using the current reward and the current action selection output.

In some implementations, the current action selection output further includes a predicted expected return output that is an estimate of a time-discounted return resulting from the environment being in the current state. Performing the iteration of the reinforcement learning technique comprises performing an iteration of an actor-critic technique.

In some implementations, the method further includes determining one or more auxiliary outputs using the current observation embedding, the current text embedding, or both. An auxiliary update to current values of parameters of the language encoder model, the observation encoder neural network, and the action selection neural network is determined by performing an iteration of the machine learning training technique to optimize an auxiliary objective that is based on the one or more auxiliary outputs.

In some implementations, determining the one or more auxiliary outputs includes predicting a next observation to be received after the agent performs the selected action using a temporal autoencoder neural network that receives as input an embedding of the selected action and the current observation embedding.

In some implementations, determining the auxiliary update includes obtaining an actual next observation. An update to the current values of the parameters of the observation encoding neural network is determined by performing an iteration of gradient descent to minimize a loss between the actual next observation and the predicted next observation.

In some implementations, the temporal autoencoder neural network shares one or more parameters with the action selection neural network, and determining the auxiliary update further includes determining an update to the current values of the shared parameters.

In some implementations, determining the one or more auxiliary outputs includes obtaining data identifying a meaningful word, where the meaningful word is a word in the current text string that affects performance of the current task by the agent. The current observation is processed using a language prediction neural network that shares at least some parameters with the observation encoding neural network to generate a probability distribution over a vocabulary of words, where the probability for each word represents a likelihood that the word should be the meaningful word.

In some implementations, determining the auxiliary update includes determining an update to the current values of the parameters of the observation encoding neural network by performing an iteration of gradient descent to minimize a negative log likelihood of the probability for the determined meaningful word.

In some implementations, determining the one or more auxiliary outputs further includes processing an intermediate output of the action selection neural network using a reward prediction neural network that is configured to generate a predicted reward. The predicted reward is an estimate of a reward that will be received as a result of the agent performing the current action in response to the current observation.

In some implementations, determining the auxiliary update includes determining an update to current values of parameters of the language encoder model, the observation encoder neural network, and the action selection neural network by performing an iteration of gradient descent to minimize a loss between the predicted reward and the current reward.

In some implementations, the current action selection output further includes a predicted expected return output that is an estimate of a time-discounted return resulting from the environment being in the current state. Determining the one or more auxiliary outputs further includes re-sampling a recent observation and a recent text embedding from a replay memory, and processing the recent observation and the recent text embedding to generate a predicted expected return output for the recent observation and the recent text embedding.

In some implementations, determining the auxiliary update includes determining an update to current values of parameters of the language encoder model, the observation encoder neural network, and the action selection neural network by performing an iteration of value function regression using the predicted expected return for the recent observation and the recent text embedding.

According to a third aspect, there is provided a system including one or more computers and one or more storage devices storing instructions that when executed by the one or more computers cause the one or more computers to perform the operations of the previously described method.

According to a fourth aspect, there is provided one or more computer storage media storing instructions that when executed by one or more computers cause the one or more computers to perform the operations of the previously described method.

According to a fifth aspect, there is provided a system including one or more computers and one or more storage devices storing instructions that when executed by the one or more computers cause the one or more computers to perform the respective operations of the previously described subsystem.

According to a sixth aspect, there is provided one or more computer storage media storing instructions that when executed by one or more computers cause the one or more computers to perform the respective operations of the previously described subsystem.

According to a seventh aspect, there is provided one or more computer storage media storing the respective instructions of the previously described system.

According to an eight aspect, there is provided a computing system for learning relationships between two different modes of input data relating to a common environment. The system includes a first, environment neural network module to receive environment input data representing the environment and to output environment feature data representing features of the environment. The system includes a second, task neural network module to receive task input data relating to one or more tasks to be performed in relation to the environment, and to output an embedded representation of the task input data. The system includes a policy defining neural network module to define a policy for the computing system. The policy defining neural network module is coupled to receive data from the environment neural network module and from the task neural network module and to output action data in accordance with the policy. The action data represents an action to perform in the environment. The policy defines the action to perform in the environment responsive to the environment input data and to the task input data. The action is one of a sequence of actions controlled by the system intended to accomplish the task. The policy defining neural network module includes a recurrent neural network defining a state in a sequence of states of the computing system.

The system includes a reinforcement learning training module, coupled to the environment neural network module, the task neural network module, and the policy defining neural network module. The reinforcement learning training module trains the environment neural network module, the task neural network module, and the policy defining neural network module in response to reward data representing successful performance of the one or more tasks. The system includes at least one auxiliary neural network module, where the auxiliary neural network module includes a first set of weights shared with one or more of the environment neural network module, the task neural network module, and the policy defining neural network module, to train the environment neural network module, and a second set of weights. The auxiliary neural network module is configured for unsupervised training using one or both of the environment input data and the task input data.

In some implementations, the computing system includes a combining module between the first and second neural network modules and the policy defining neural network module. The combining module has inputs coupled to the first and second neural network modules to combine the environment feature data and the embedded representation of the task input data, and is configured to output combined representation data for the policy defining neural network module.

In some implementations, at least one auxiliary neural network module includes a prediction auxiliary neural network module. The prediction auxiliary neural network module is configured for unsupervised training based upon a comparison of a current state of the environment input data and a predicted a future state of the environment input data.

In some implementations, the prediction auxiliary neural network module is configured to predict a future state of the environment input data from a current state of the environment input data and the action data. The first set of weights includes weights shared with the environment neural network module and weights shared with the policy defining neural network.

In some implementations, the prediction auxiliary neural network module includes a temporal autoregressive neural network.

In some implementations, at least one auxiliary neural network module includes a modelling auxiliary neural network module. The modelling auxiliary neural network module is configured for unsupervised training based upon a connection between the environment input data and the task input data.

In some implementations, the modelling auxiliary neural network module is configured to receive the environment input data and to output one or more data elements representing the task input data. The first set of weights includes weights shared with the environment neural network module and the task neural network module. The modelling auxiliary neural network module is configured for unsupervised training based upon a comparison of the task input data and the one or more data elements representing the task input data.

In some implementations, the task neural network module includes a recurrent neural network, and the task input data includes a sequence of data items relating to the one or more tasks to be performed.

In some implementations, the environment input data includes image data.

In some implementations, the task input data includes linguistic data.

According to a ninth aspect, there is provided a non-transitory data carrier carrying processor control code to implement the previously described computing system.

According to a tenth aspect, there is provided a method of training a neural network-based computing system to learn relationships between two different modes of input data relating to a common environment. The computing system includes first and second neural network modules to process first and second mode input data relating to the environment, and a policy neural network module coupled to the first and second neural network modules to output action data dependent upon the first and second mode input data according to a state-action policy. The method includes training the computing system by reinforcement learning based on rewards defined by combinations of the first and second mode input data. In conjunction with the training by reinforcement learning, the method includes training one or more auxiliary neural network modules by unsupervised learning based on the first and second mode input data. The one or more auxiliary neural network modules share weights with one or more of the first and second neural network modules and the policy neural network module.

In some implementations, the method includes using one of the one or more auxiliary neural network modules to predict the effect of an action defined by the action data on the environment and training the one or more auxiliary neural network modules based on the observed effect of an action.

In some implementations, the method includes using one of the one or more auxiliary neural network modules to model the combination of the first and second mode input data.

In some implementations, the first mode input data includes image data and wherein the second mode input data includes language data.

According to an eleventh aspect, there is provided a non-transitory data carrier carrying processor control code to implement the previously described method.

According to a twelfth aspect, there is provided an electronic controller trained by reinforcement-learning to control a system having multiple states and, for each state, a set of actions to move from one of the states to next the state. The electronic controller includes a first input to receive state data from the system. The electronic controller includes a second input to receive instruction data defining instructions to be performed in relation to the system. The electronic controller includes a computing system including first and second neural network modules to process data from the first and second mode inputs. The computing system includes a policy neural network module coupled to the first and second neural network modules, to output action data dependent upon the state data and the instruction data according to a state-action policy. The electronic controller includes at least one auxiliary neural network module, where the auxiliary neural network module includes weights shared with one or more of the first, second, and policy neural network modules to train the environment neural network module, and a second set of weights.

In some implementations, one or both of the policy neural network module and the first neural network module include a recurrent neural network.

Particular embodiments of the subject matter described in this specification can be implemented so as to realize one or more of the following advantages. The system as described in this specification can be trained to select actions which cause an agent interacting with an environment to execute written instructions specified by text strings. Thereby, the system can learn to comprehend the meaning of natural language by relating natural language text strings to the environment. More specifically, the system can learn to relate the components (e.g., words and phrases) of natural language text strings to observations of the environment and to pertinent sequences of actions. Creating systems which understand the meaning of natural language, such as the system as described in this specification, is a long-standing challenge for the development of artificial intelligence (AI) which is critical to facilitating human-AI interaction.

The system as described in this specification can be trained based on text strings and observations of the environment (e.g., visual observations) without any prior knowledge about language or about the connection between the text strings and the observations. Therefore, unlike some conventional systems for computational language learning which rely on rules-based methods and prior knowledge, the system as described in this specification acquires semantic knowledge which can generalize with respect to new environments and new text strings. For example, the system as described in this specification can use words it already knows to interpret unfamiliar phrases in a text string and successfully execute instructions specified by the text string in an unfamiliar environment. Moreover, the rate at which the system as described in this specification learns new words can accelerate over time as the system bootstraps its existing knowledge to enable the acquisition of new knowledge.

By obviating the need for rules-based methods and prior knowledge required by some conventional systems, the system as described in this specification can reduce the use of computational resources (e.g., memory) relative to some conventional systems. For example, the system as described in this specification acquires knowledge which can generalize to new environments and new text strings, in contrast to some conventional systems which would require storage (e.g., in a memory) of new rules and prior knowledge in order to process data from new environments and new text strings.

The system as described in this specification can be trained by a combination of task-specific parameter updates, which are based on rewards received by the system for progress in completing tasks, and auxiliary parameter updates, which exploit the stream of potentially useful perceptual feedback from the observations available at each time step. Training the system using auxiliary parameter updates can reduce the amount of computational resources (e.g., memory and computing power) required to train the system, particularly when the rewards received by the system are sparse (i.e., only rarely non-zero). The rewards received by the system may be sparse if, for example, the system receives a non-zero reward after completing tasks, but receives few non-zero rewards while completing tasks. The system as described in this specification may be trained to achieve an acceptable level of task performance over fewer training iterations than some conventional systems that are trained without the benefit of auxiliary parameter updates.

The agent may be a robot, or a semi-autonomous or autonomous vehicle. For such devices, the environment may be the real world, in which case the observations may be obtained from cameras, laser sensors or other such devices, and the actions may be real-world tasks, such as navigating through the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
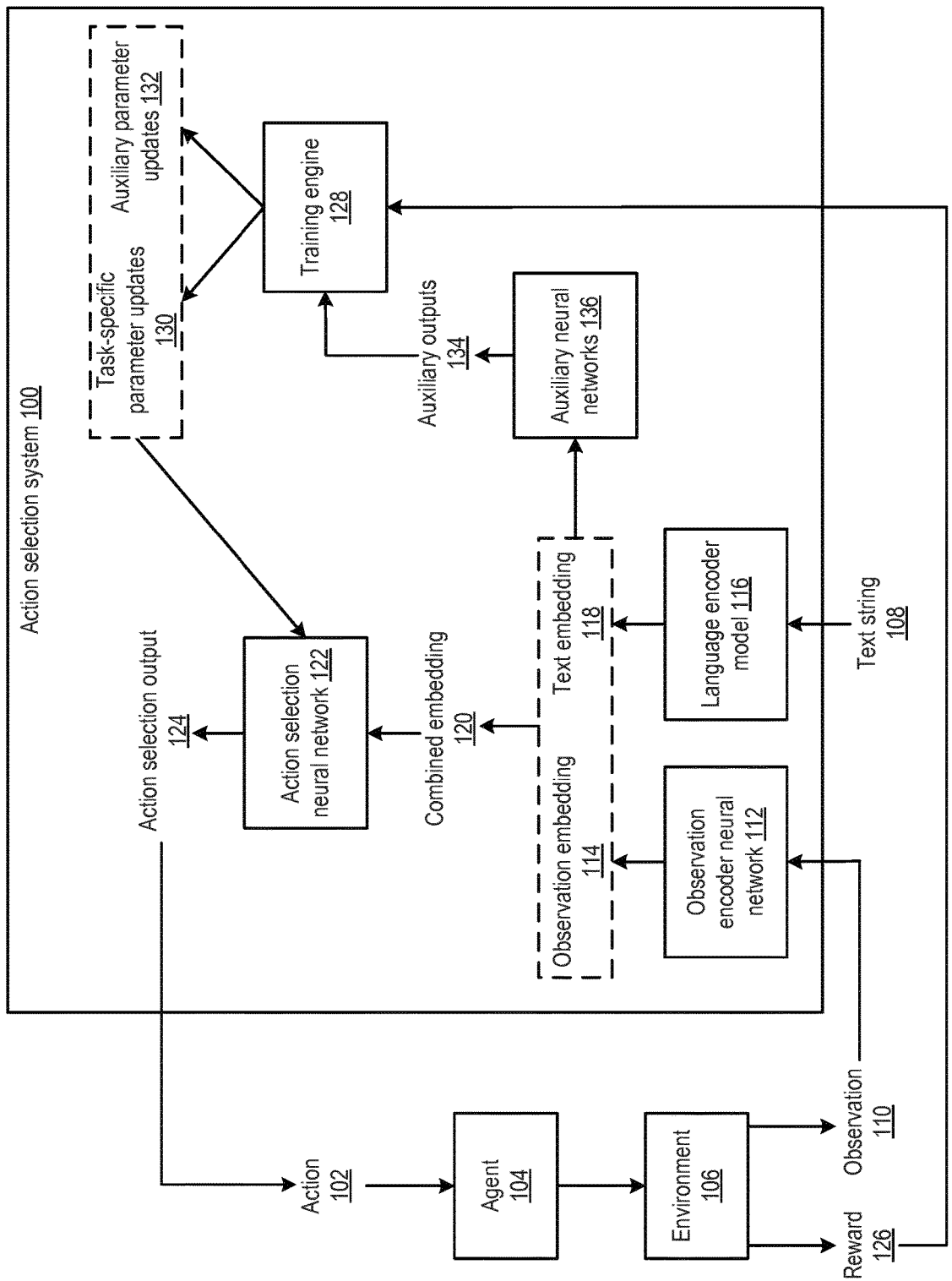
FIG. 1A is a block diagram of an example action selection system.

FIG. 1A shows an example action selection system 100. The action selection system 100 is an example of a system implemented as computer programs on one or more computers in one or more locations in which the systems, components, and techniques described below are implemented.

The action selection system 100 selects actions 102 to be performed by an agent 104 interacting with an environment 106 at each of multiple time steps. In order for the agent 104 to interact with the environment 106, at each time step, the system 100 receives an input and selects an action 102 to be performed by the agent 104 in response to the received input. Generally, the input includes data characterizing the current state of the environment 106 (e.g., an image of the environment 106) and data of another modality (e.g., a text string 108) that expresses some information about a task currently being performed by the agent 104 (or a task to be performed by the agent 104). Data characterizing a state of the environment 106 will be referred to in this specification as an observation 110.

The system 100 described herein is widely applicable and is not limited to one specific implementation. However, for illustrative purposes, a small number of example implementations are described below.

In some implementations, the environment 106 is a real-world environment and the agent 104 is a mechanical agent interacting with the real-world environment. For example, the agent 104 may be a robot interacting with the environment 106 to accomplish a specific task. As another example, the agent 104 may be an autonomous or semi-autonomous vehicle navigating through the environment 106. In these implementations, the actions 102 may be control inputs to control the robot or the autonomous vehicle. In some of these implementations, the observations 110 may be generated by or derived from sensors of the agent 104. For example, the observations 110 may be captured by a camera of the agent 104. As another example, the observations 110 may be derived from data captured from a laser sensor of the agent 104. As another example, the observations 110 may be hyperspectral images captured by a hyperspectral sensor of the agent 104.

In some implementations, the environment 106 may be a simulated environment and the agent 104 may be implemented as one or more computer programs interacting with the simulated environment. For example, the simulated environment 106 may be a video game and the agent 104 may be a simulated user playing the video game. As another example, the simulated environment 106 may be a motion simulation environment, e.g., a driving simulation or a flight simulation, and the agent 104 may be a simulated vehicle navigating through the motion simulation environment. In these implementations, the actions 102 may be control inputs to control the simulated user or simulated vehicle.

As described earlier, the input received by the system 100 includes data of another modality (e.g., a modality different than that of the modality of the observation 110) that expresses some information about a task currently being performed by the agent 104 (or a task to be performed by the agent 104). For example, the other modal data may be an instruction in a natural language (e.g., English) for the agent 104 to perform a task. In particular examples, the task may be for the agent 104 to navigate to a particular location in the environment 106 (e.g., in which case the instruction might be: "navigate to the school") or to locate a particular object in the environment 106 (e.g., in which case the instruction might be: "find the red object"). The other modal data may be submitted by a user of the system 100, for example, through a keyboard or a microphone. The user of the system 100 may be, for example, a driver of an autonomous vehicle agent 104 or an operator of a robot agent 104. While the system 100 is described herein as receiving other modal data in the form of a text string 108, more generally, the other modal data may be of any appropriate format. For example, the other modal data may be audio data expressing an utterance of a user of the system 100.

In some implementations, the text string 108 received by the system 100 is the same at each time step during the performance of a current task. For example, at each time step during the performance of the current task, the text string 108 may be an instruction in a natural language for the agent 104 to perform the current task. Generally, when the text string 108 received by the system 100 is the same at each time step, the system 100 can maintain the text string 108 (e.g., in a memory) and does not require a user of the system 100 to repeatedly provide the same text string 108 at multiple time steps. In some implementations, the text string 108 received by the system 100 may differ between time steps during the performance of the current task. For example, at later time steps during the performance of the current task, the text string 108 may be an instruction to perform the current task where the instruction specifies more details about how the task should be performed than at earlier time steps during the performance of the current task.

The system 100 processes the current observation 110 using an observation encoder neural network 112 in accordance with current values of observation encoder neural network parameters to generate an observation embedding 114. In some implementations, the current observation 110 is an image, the observation encoder neural network 112 is a convolutional neural network, and the current observation embedding 114 is a feature matrix describing the current observation 110. Generally, an embedding refers to a numerical representation of an input, for example, as a vector or a matrix or other ordered collection of numeric values.

The system 100 processes a representation of the current text string 108 using a language encoder model 116 (which can also be referred to as a "language encoder module") to generate a current text embedding 118. For example, the representation of the current text string 108 may be a sequence of numerical representations, where each numerical representation represents a respective character (or word) from a dictionary of possible characters (or words), and the current text embedding 118 may be a feature vector representing the current text string 108. In some implementations, the language encoder model 116 is a recurrent neural network (e.g., a long short-term memory network (LSTM)) that is configured to process the current text string 108 over a series of internal time steps to generate the current text embedding 118. In some implementations, particularly when the order of the words in the current text string 108 is not important, the language encoder model 116 is a bag-of-words language encoder. A bag-of-words language encoder may generate the current text embedding 118 by summing the numerical representations of each character (or word) of the current text string 108.

At each time step, the system 100 combines the current observation embedding 114 and the current text embedding 118 to determine a current combined embedding 120, and uses the current combined embedding 120 to select an action 102 to be performed by the agent 104 in response to the current observation 110. For example, the system 100 may process the current combined embedding 120 using an action selection neural network 122 in accordance with current values of action selection neural network parameters to generate an action selection output 124. In this example, the system 100 may select the action 102 to be performed at the time step based on the action selection output 124. The action selection neural network 122 may be implemented, for example, as a recurrent neural network (e.g., an LSTM) or a feedforward neural network (e.g., a multi-layer perceptron).

In some implementations, the action selection output 124 defines a probability distribution over actions in a set of possible actions that can be performed by the agent 104. For example, the action selection output 124 may include a respective numerical likelihood value for each action in the set of possible actions. As another example, the action selection output 124 may include parameter values (e.g., mean and standard deviation values) defining a parametric probability distribution (e.g., a Normal distribution) over the set of possible actions. In some of these implementations, the system 100 selects the action 102 to be performed by the agent 104 by sampling an action from the set of possible actions based on the probability distribution. In some of these implementations, the system selects the action 102 to be performed by the agent 104 as the action from the set of possible actions having the highest probability according to the probability distribution. In others of these implementations, the system selects the action to be performed by the agent by sampling from the probability distribution.

In some implementations, the action selection output 124 identifies a best possible action to be performed by the agent 104 in response to the current observation 110, and the system 100 selects the action 102 to be the best possible action. For example, if the agent 104 is a robotic agent, the action selection output 124 may identify the best possible torques to be applied to the joints of the agent 104.

In some implementations, the action selection output 124 includes a respective Q value for each action in the set of possible actions. A Q value for an action is an estimate of a return that will be received by the system 100 if the agent 104 performs the action in response to the current observation 110. A return refers to a cumulative measure of reward received by the system 100 as the agent 104 interacts with the environment 106 over multiple time steps. For example, a return may refer to a long-term time-discounted sum of rewards received by the system 100. In some of these implementations, the system selects the action 102 to be performed by the agent 104 at the time step to be the action having the highest Q value.

At each time step, the system 100 may receive a reward 126 based on the current state of the environment 106 and the current action 102 of the agent 104. Generally, the reward 126 is represented as one or more numerical values. The reward 126 can be based on any event or aspect of the environment 106. For example, the reward may indicate whether the agent 104 has successfully performed a task specified by the text string 108.

The system 100 includes a training engine 128 that is configured to train the system 100 over multiple training iterations. The training engine 128 trains the system 100 by iteratively (i.e., at each training iteration) adjusting the current parameter values of one or more of: the action selection neural network 122, the observation encoder neural network 112, and the language encoder model 116. The training engine 128 may cause the system 100 to select actions 102 which enable the agent 104 to more effectively perform tasks specified by the text strings 108. Thereby, the training engine 128 causes the system 100 to learn to comprehend the meaning of natural language by relating natural language text strings 108 to the environment 106. More specifically, the training engine 128 causes the system 100 to learn to relate the components (e.g., words and phrases) of natural language text strings 108 to observations 110 of the environment 106 and to pertinent sequences of actions 102.

At each of multiple training iterations, the training engine 128 determines task specific parameter updates 130 and applies the task specific parameter updates 130 to adjust the current parameter values of one or more of: the action selection neural network 122, the observation encoder neural network 112, and the language encoder model 116. As will be described further with reference to FIG. 3, the training engine 128 may determine the task specific parameter updates 130 by performing an iteration of a machine learning training technique to optimize a task-specific objective that is based on the rewards 126 received by the system. For example, the task-specific objective may be to maximize a time-discounted expected return received in response to actions 102 performed by the agent 104 during performance of the current task. The machine learning training technique may be a reinforcement learning technique (e.g., an actor-critic reinforcement learning technique) to optimize the task-specific objective using the current reward 126 and the current action selection output 124. The machine learning training technique may include backpropagating gradients of the task-specific objective through the action selection neural network 122 and into the language encoder model 116 and the observation encoder neural network 112.

In addition to training the system 100 using task-specific parameter updates based on the rewards 126 (which may be sparse), the training engine 128 may exploit the stream of potentially useful perceptual feedback from the observations 110 available at each time step as the agent 104 explores the environment 106. At each of multiple training iterations, the training engine 128 may determine auxiliary parameter updates 132 and apply the auxiliary parameter updates 132 to adjust the current parameter values of one or more of: the action selection neural network 122, the observation encoder neural network 112, and the language encoder model 116. As will be described further with reference to FIG. 4, the training engine may determine the auxiliary parameter updates 132 by performing an iteration of a machine learning training technique to optimize an auxiliary objective based on one or more auxiliary outputs 134. The system 100 may generate the auxiliary outputs 134 using one or more auxiliary neural networks 136 and, in some cases, the action selection neural network 122. The machine learning training technique may include backpropagating gradients of the auxiliary objective into the action selection neural network 122, the language encoder model 116, and the observation encoder neural network 112.

The auxiliary neural networks 136 may process inputs including the current observation embedding 114, the current text embedding 118, or both, to generate auxiliary outputs 134 that involve predicting or modeling aspects of the environment 106. For example, the auxiliary neural networks 136 may include a temporal autoencoder neural network which is configured to generate an auxiliary output including a prediction for a next observation 110 to be received after the agent 104 performs the current action 102 at the current time step. As another example, the auxiliary neural networks 136 may include a language prediction neural network which is configured to generate an auxiliary output 134 defining a prediction for a meaningful word included in the current text string 108. As another example, the auxiliary neural networks 136 may include a reward prediction neural network which is configured to generate an auxiliary output 134 including a predicted reward that is an estimate of a reward that will be received as a result of the agent 104 performing the current action 102 at the current time step. As another example, the action selection output 124 of the action selection neural network 122 may include an auxiliary output defining a predicted expected return output that is an estimate of a time-discounted return resulting from the environment being in the current state.

Figure 1B:
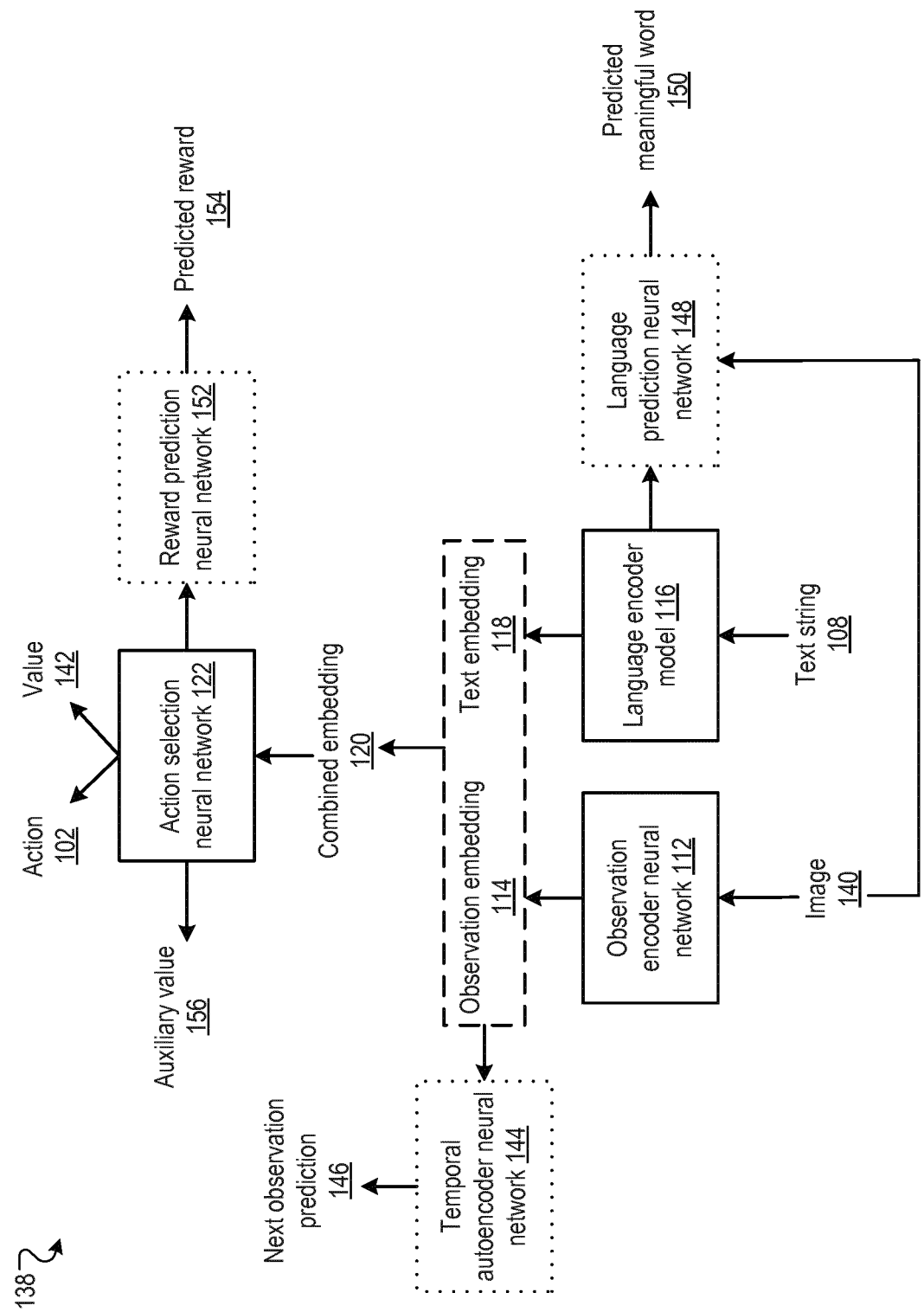
FIG. 1B is a block diagram of an example architecture of an action selection system.

FIG. 1B is a block diagram of an example architecture 138 of an action selection system, e.g., the action selection system 100 of FIG. 1.

In the example architecture 138, the observations 110 are images 140, the observation encoder neural network 112 is a convolutional neural network, and the language encoder model 116 is an LSTM recurrent neural network. The action selection neural network 122 is also an LSTM recurrent neural network which, at each time step, is configured to generate an output defining an action 102 to be performed by the agent 104 and an estimate of a value 142 of the current state, i.e., a time-discounted return resulting from the environment 106 being in the current state.

The temporal autoencoder neural network 144 is a deconvolutional neural network which is configured to process an input including an embedding of the current action 102 and the current observation embedding 114 to generate an auxiliary output including a next observation prediction 146. The next observation prediction 146 is a prediction of an image 140 to be received after the agent 104 performs the current action 102 at the current time step.

The language prediction neural network 148 is configured to process an input including the current image 140 and an intermediate output of the language encoder model 116 to generate an auxiliary output defining a prediction for a meaningful word 150 included in the text string 108. A meaningful word refers to a word that affects performance of the current task by the agent 104. The language prediction neural network 148 shares some parameters with the observation encoder neural network 112.

The reward prediction neural network 152 is configured to process an input including an intermediate output of the action selection neural network 122 to generate an auxiliary output including a predicted reward 154. The predicted reward 154 is an estimate of a reward that will be received as a result of the agent 104 performing the current action 102 at the current time step.

The system 100 generates an auxiliary value 156 output by re-sampling a recent observation embedding and a recent text embedding from a replay memory, and processing the recent observation embedding and the recent text embedding using the action selection neural network 122 to generate the auxiliary value 156. The auxiliary value 156 is an estimate of a value of the state characterized by the recent observation embedding and the recent text embedding.

The training engine 128 determines task-specific parameter updates for the system 100 using an actor-critic reinforcement learning technique based on the rewards received by the system 100, as will be described further with reference to FIG. 3. The training engine 128 determines auxiliary parameter updates for the system 100 based on the next observation prediction 146, the predicted meaningful word 150, the predicted reward 154, and the auxiliary value 156, as will be described further with reference to FIG. 4.

Figure 2:
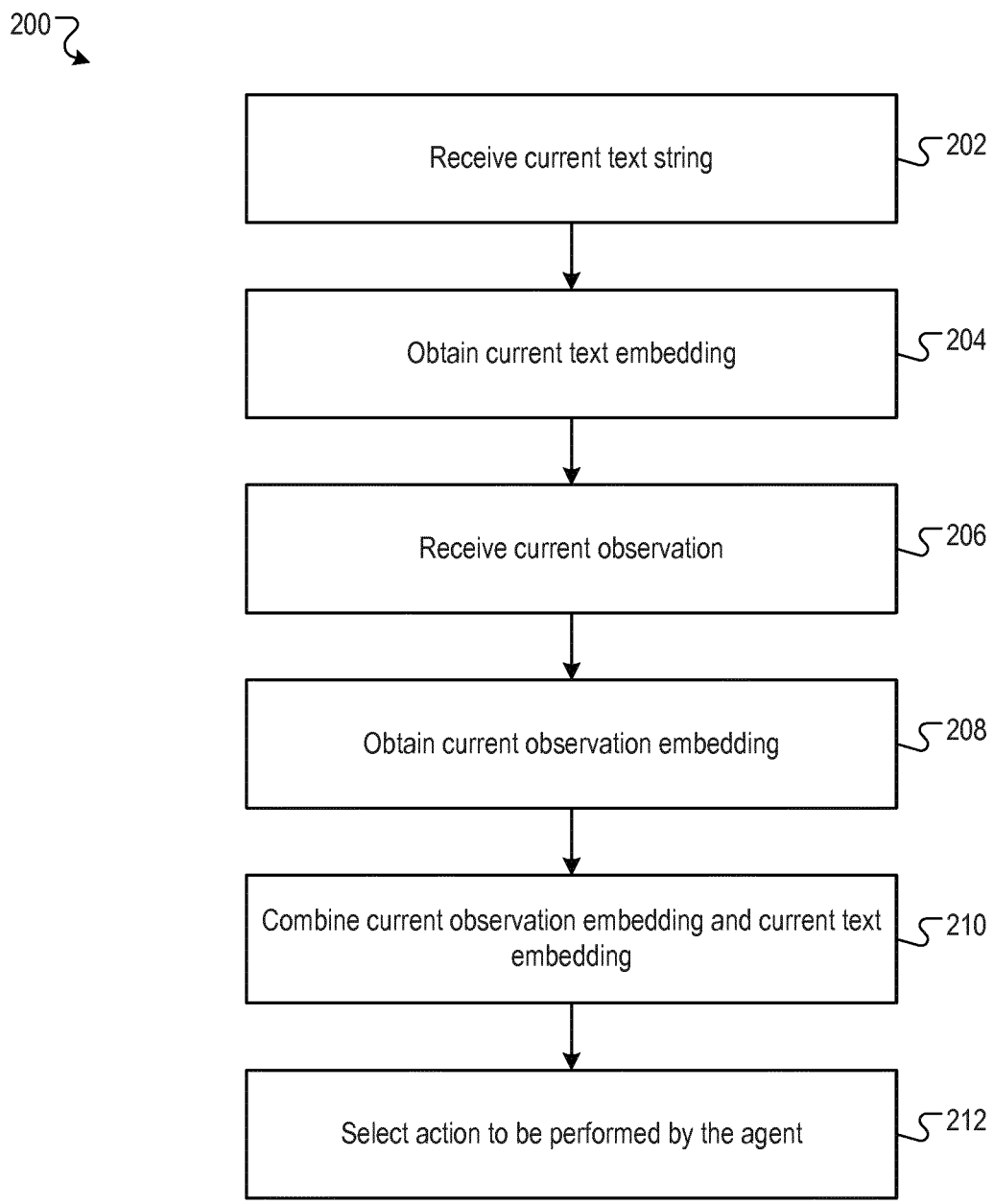
FIG. 2 is a flow diagram of an example process for selecting an action to be performed by an agent.

FIG. 2 is a flow diagram of an example process for selecting an action to be performed by an agent (i.e., at a given time step). For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system receives a current text string that expresses some information about a task currently being performed by the agent (or a task to be performed by the agent) (202). For example, the current text string may be an instruction in a natural language (e.g., English) for the agent to perform a task.

The system obtains a current text embedding of the current text string (204). More specifically, the system processes a representation of the current text string using a language encoder model to generate the current text embedding. For example, the representation of the current text string may be a sequence of numerical representations, where each numerical representation represents a respective character (or word) from a dictionary of possible characters (or words), and the current text embedding may be a feature vector representing the current text string. In some implementations, the language encoder model is a recurrent neural network (e.g., a long short-term memory network (LSTM)) that is configured to process the current text string over a series of internal time steps to generate the current text embedding. In some implementations, particularly when the order of the words in the current text string is not important, the language encoder model is a bag-of-words language encoder. A bag-of-words language encoder may generate the current text embedding by summing the numerical representations of each character (or word) of the current text string.

The system receives a current observation characterizing the current state of the environment (206). The observation may be generated by or derived from sensors of the agent. For example, the observation may be captured by a camera of the agent. As another example, the observation may be derived from data captured from a laser sensor of the agent. As another example, the observation may be hyperspectral images captured by a hyperspectral sensor of the agent.

The system obtains a current observation embedding of the current observation (208). More specifically, the system processes the current observation using an observation encoder neural network in accordance with current values of observation encoder neural network parameters to generate the current observation embedding. In some implementations, the current observation is an image, the observation encoder neural network is a convolutional neural network, and the current observation embedding is a feature matrix describing the current observation.

The system combines the current observation embedding and the current text embedding to obtain a current combined embedding (210). For example, the system may flatten a feature matrix of the current observation (as determined in step 208) and concatenate the flattened feature matrix and a feature vector of the current text string (as determined in step 204). Flattening a matrix refers to transforming the matrix into a vector by concatenating the components of the matrix into a vector in a predetermined order.

The system selects an action to be performed by the agent using the current combined embedding (212). For example, the system may process the current combined embedding using an action selection neural network in accordance with current values of action selection neural network parameters to generate an action selection output. In this example, the system may select the action to be performed at the time step based on the action selection output.

In some implementations, the action selection output defines a probability distribution over actions in a set of possible actions that can be performed by the agent. For example, the action selection output may include a respective numerical likelihood value for each action in the set of possible actions. As another example, the action selection output may include parameter values (e.g., mean and standard deviation values) defining a parametric probability distribution (e.g., a Normal distribution) over the set of possible actions. In some of these implementations, the system selects the action to be performed by the agent by sampling an action from the set of possible actions based on the probability distribution. In some of these implementations, the system selects the action to be performed by the agent as the action from the set of possible actions having the highest probability according to the probability distribution.

In some implementations, the action selection output identifies a best possible action to be performed by the agent in response to the current observation, and the system selects the action to be the best possible action. For example, if the agent is a robotic agent, the action selection output may identify the best possible torques to be applied to the joints of the agent.

In some implementations, the action selection output includes a respective Q value for each action in the set of possible actions. A Q value for an action is an estimate of a return that will be received by the system if the agent performs the action in response to the current observation. A return refers to a cumulative measure of reward received by the system as the agent interacts with the environment over multiple time steps. For example, a return may refer to a long-term time-discounted reward received by the system. In some of these implementations, the system selects the action to be performed by the agent at the time step to be the action having the highest Q value.

In some implementations, the system selects the action to be performed by the agent in accordance with an exploration policy. Generally, selecting an action in accordance with an exploration policy refers to selecting an action that is different from an action that would be selected based on the current action selection policy (e.g., as defined by the current parameter values of the action selection neural network). For example, the system may select the action to be performed by the agent in accordance with an ∈-greedy exploration policy. In this example, the system may select the action to be performed by the agent based on the action selection output with probability 1-∈, and may select the action to be performed by the agent randomly with probability ∈ (where ∈ is a number between 0 and 1).

Figure 3:
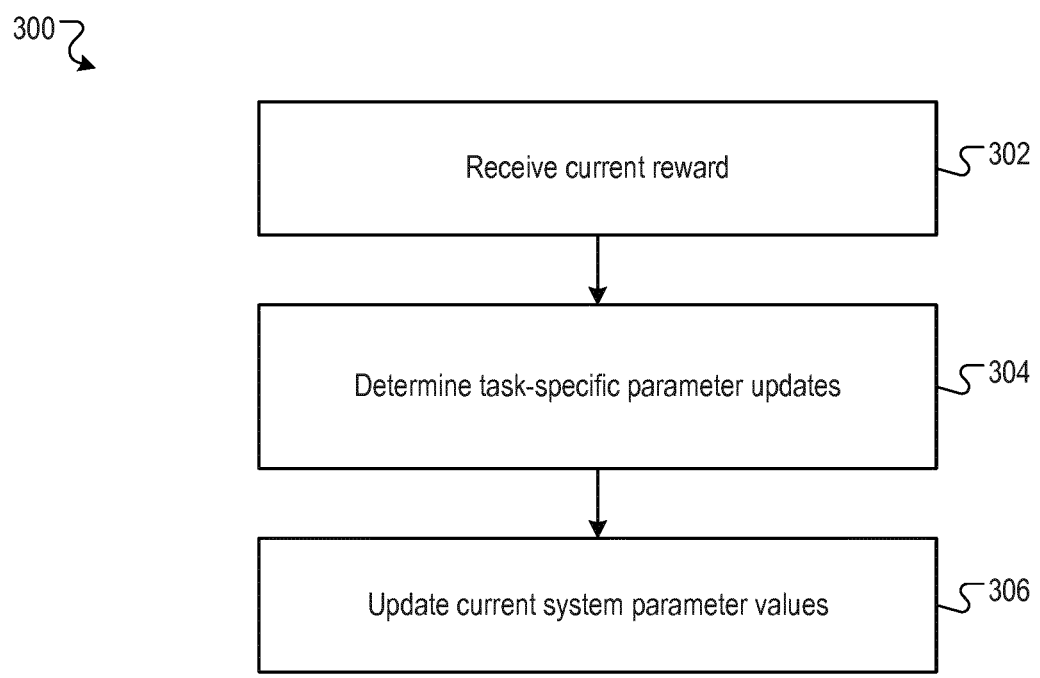
FIG. 3 is a flow diagram of an example process for training an action selection system using task-specific parameter updates.

FIG. 3 is a flow diagram of an example process for training an action selection system using task-specific parameter updates (i.e., at a given training iteration). For convenience, the process 300 will be described as being performed by a system of one or more computers located in one or more locations. For example, an action selection system, e.g., the action selection system 100 of FIG. 1, appropriately programmed in accordance with this specification, can perform the process 300.

The system receives a reward (302). Generally, the reward is represented as one or more numerical values. The reward can be based on any event or aspect of the environment. For example, the reward may indicate whether the agent has successfully performed a task specified by the text string. In some implementations, the system receives a current reward as a result of the agent performing a current action in response to a current observation, as described with reference to FIG. 2. In some implementations, the system obtains data including a previous reward, a previous action performed by the agent, and an observation characterizing a previous state of the environment at a previous time step from a replay memory. A replay memory refers to an external memory (e.g., a logical data storage area or physical data storage device) where the system can store data (e.g., observations, selected actions, rewards, and the like) at each time step.

The system determines task-specific parameter updates by performing an iteration of a machine learning training technique to optimize a task-specific objective that is based on the rewards received by the system (304). For example, the task-specific objective may be to maximize a time-discounted expected return received in response to actions performed by the agent during performance of the current task. In this example, the time-discounted expected return may be given by:

$$\mathbb{E}_\pi\left[\sum_{t=0}^{\infty} \lambda^t \cdot r_t\right] \tag{1}$$

where $\mathbb{E}_\pi[\cdot]$ is the expectation operator with respect to the action selection policy $\pi$ of the system, $\lambda$ is a discount factor (typically a number between 0 and 1), t indexes time steps, and $r_t$ is the reward received by the system at time step t. The machine learning training technique may be a reinforcement learning technique to optimize the task-specific objective. For example, the reinforcement learning technique may be a policy gradient technique, a one-step or n-step Q learning technique, or an actor-critic technique. When the reinforcement learning technique is an actor-critic technique, the action selection output of the action selection neural network may include an estimate of the value of the current state, i.e., a time-discounted return resulting from the environment being in the current state.

The system may determine the task-specific parameter updates by determining a gradient of the task-specific objective (e.g., as defined by equation (1)) with respect to the parameters of the action selection neural network, the language encoder model, and the observation encoder neural network. The system may determine the gradient of the task-specific objective using, for example, a backpropagation technique. The task-specific parameter updates may be represented as a vector or matrix or numerical values, where each numerical value corresponds to a different parameter of the action selection neural network, the language encoder model, or the observation encoder neural network.

The system updates the current values of the parameters of the action selection neural network, the language encoder model, and the observation encoder neural network using the task-specific parameter updates (306). For a given parameter $\theta$, the system may update the current value of the parameter by:

$$\theta \leftarrow \theta - r \cdot \nabla_\theta \mathcal{L} \tag{2}$$

where r is a positive learning rate hyper-parameter (i.e., a system hyper-parameter governing how quickly parameter values can change during training) and $\nabla_\theta \mathcal{L}$ is a gradient of the task-specific objective with respect to the parameter $\theta$ (e.g., as determined in step 304).

Figure 4:
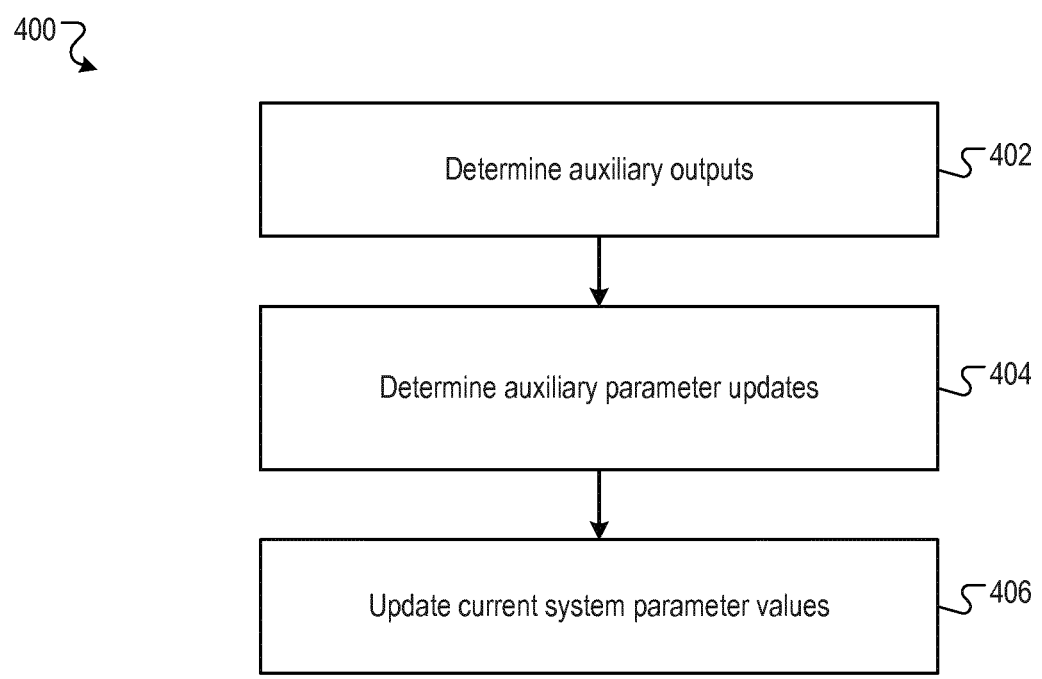
FIG. 4 is a flow diagram of an example process for training an action selection system using auxiliary parameter updates.

FIG. 4 is a flow diagram of an example process for training an action selection system using auxiliary parameter updates (i.e., at a given training iteration). For convenience, the process 400 will be described as being performed by a system of one or more computers located in one or more locations. For example, an action selection system, e.g., the action selection system 100 of FIG. 1, appropriately programmed in accordance with this specification, can perform the process 400.

The system determines one or more auxiliary outputs (402). The system may generate the auxiliary outputs using one or more auxiliary neural networks and, in some cases, the action selection neural network.

In some implementations, the auxiliary neural networks include a temporal autoencoder neural network. The temporal autoencoder neural network is configured to process an input including an embedding of the current action and the current observation embedding to generate an output including a prediction for a next observation to be received after the agent performs the current action at the current time step. For example, if the observations are images (e.g., RGB images) of the environment, then the temporal autoencoder neural network generates a predicted image of the environment after the agent performs the current action at the current time step.

In some implementations, the temporal autoencoder neural network shares one or more parameters with the action selection neural network. Two neural networks are said to share a parameter if the value of the parameter is the same for both neural networks, and changing the value of the parameter in one neural network (e.g., during training) causes the value of the parameter to change in the other neural network as well. In a particular example, the temporal autoencoder neural network may determine an intermediate representation $\hat{y}$ as:

$$\hat{y} = W_{\hat{y}}(W_b a \odot W_v y) \quad (3)$$

where $W_{\hat{y}}$, $W_b$, and $W_v$ are parameter matrices, $\odot$ refers to an element-wise multiplication operation, y is the current observation embedding, and $W_b$ a is an embedding of the current action where the parameter matrix $W_b$ shares its parameters with the action selection neural network. The temporal autoencoder neural network may process the intermediate representation $\hat{y}$ using a deconvolutional neural network to generate the prediction for the next observation.

In some implementations, the auxiliary neural networks include a language prediction neural network. The language prediction neural network may share some parameters with the observation encoding neural network and is configured to process an input including the current observation and an intermediate output of the language encoder model to generate an auxiliary output defining a prediction for a meaningful word included in the current text string. A meaningful word refers to a word that affects performance of the current task by the agent. For example, if the current text string specifies the current task to be: "navigate to the pharmacy", then the word "pharmacy" may be a meaningful word. The auxiliary output generated by the language prediction neural network may be a probability distribution over a vocabulary of words, where the probability for each word represents a likelihood that the word should be the meaningful word. In some cases, the auxiliary output of the language prediction neural network can be interpreted as defining a prediction for a word which best describes the current observation.

In some implementations, the auxiliary neural networks include a reward prediction neural network. The reward prediction neural network is configured to process an input including an intermediate output of the action selection neural network to generate an auxiliary output including a predicted reward that is an estimate of a reward that will be received as a result of the agent performing the current action at the current time step.

In some implementations, the action selection output of the action selection neural network includes a value (i.e., predicted expected return) output that is an estimate of a time-discounted return resulting from the environment being in the current state. In some of these implementations, the system generates an auxiliary value output by re-sampling a recent observation embedding and a recent text embedding from a replay memory, and processing the recent observation and the recent text embedding using the action selection neural network to generate an auxiliary value (i.e., predicted expected return) output. The auxiliary value output is an estimate of a value of the state characterized by the recent observation embedding and the recent text embedding. A recent observation embedding and a recent text embedding refers to an observation embedding and a text embedding generated at a previous time step. The system may re-sample a recent observation embedding and a recent text embedding from the replay memory by obtaining the observation embedding and the text embedding corresponding to a randomly sampled previous time step.

The system determines auxiliary parameter updates by performing an iteration of a machine learning training technique to optimize an auxiliary objective that is based on the one or more auxiliary outputs (404).

In some implementations, the auxiliary outputs include the output of a temporal autoencoder neural network including a prediction for a next observation to be received after the agent performs the current action at the current time step (as described in step 402). In some of these implementations, the system obtains an actual next observation and determines an auxiliary parameter update to the current values of the parameters of the observation encoding neural network by performing an iteration of gradient descent to minimize a loss between the actual next observation and the predicted next observation. For example, the loss may be a mean-squared-error (MSE) loss. In some of these implementations, the temporal autoencoder neural network shares one or more parameters with the action selection neural network, and the system determines the auxiliary parameter update with respect to the current values of the shared parameters.

In some implementations, the auxiliary outputs include the output of a language prediction neural network including a probability distribution over a vocabulary of words, where the probability for each word represents a likelihood that the word is a meaningful word (as described in step 402). In some of these implementations, the system obtains data identifying a meaningful word and determines an auxiliary parameter update to the current values of the parameters of the observation encoding neural network by performing an iteration of gradient descent to minimize a negative log likelihood of the probability for the determined meaningful word.

In some implementations, the auxiliary outputs include the output of a reward prediction neural network including a predicted reward that is an estimate of a reward that will be received as a result of the agent performing the current action at the current time step (as described in step 402). In some of these implementations, the system determines an auxiliary update to the parameters of the language encoder model, the observation encoder neural network, and the action selection neural network by performing an iteration of gradient descent to minimize a loss between the predicted reward and the current reward. For example, the loss may be a squared-error loss.

In some implementations, the auxiliary outputs include a predicted expected return output generated by the action selection neural network by processing a recent observation embedding and a recent text embedding. In some of these implementations, the system determines an auxiliary update to the current values of the parameters of the language encoder model, the observation encoder neural network, and the action selection neural network by performing an iteration of value function regression using the predicted expected return for the recent observation and the recent text embedding.

When the system determines multiple auxiliary parameter updates (e.g., based on auxiliary outputs generated by multiple auxiliary neural networks), the system can combine the multiple auxiliary parameter updates to determine a final auxiliary parameter update. For example, the system can combine the multiple auxiliary parameter updates by a weighted linear combination, where the weights of the linear combination are system hyper-parameters.

The system updates the current values of the parameters of the action selection neural network, the language encoder model, and the observation encoder neural network using the auxiliary parameter updates (406). An example process for updating the current values of the system parameters is described with reference to step 306.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system for selecting actions to be performed by an agent interacting with an environment, the system comprising one or more computers and one or more storage devices storing instructions that when executed by the one or more computers cause the one or more computers to implement:
   a language encoder model that is configured to:
      receive an input text string in a particular natural language, and
      process the input text string to generate a text embedding of the input text string;
   an observation encoder neural network that is configured to:
      receive an input observation characterizing a state of the environment, and
      process the input observation to generate an observation embedding of the input observation; and
   a subsystem that is configured to:
      receive a current text string in the particular natural language that expresses information about a current task currently being performed by the agent;
      provide the current text string as input to the language encoder model to obtain a current text embedding of the current text string;
      receive a current observation characterizing a current state of the environment;
      provide the current observation as input to the observation encoder neural network to obtain a current observation embedding of the current observation;
      combine the current observation embedding and the current text embedding to generate a current combined embedding; and
      select, using the current combined embedding, an action to be performed by the agent in response to the current observation.

2. The system of claim 1, wherein the instructions further cause the one or more computers to implement:
   an action selection neural network that is configured to:
      receive an input combined embedding, and
      process the input combined embedding to generate an action selection output.

3. The system of claim 2, wherein selecting, using the current combined embedding, an action to be performed by the agent in response to the current observation comprises:
   providing the current combined embedding as input to the action selection neural network to obtain a current action selection output; and
   selecting the action to be performed by the agent in response to the current observation using the current action selection output.

4. The system of claim 3, wherein the current action selection output defines a probability distribution over possible actions to be performed by the agent, and wherein selecting the action to be performed by the agent comprises: sampling an action from the probability distribution or selecting an action having a highest probability according the probability distribution.

5. The system of claim 3, wherein the current action selection output comprises, for each of a plurality of possible actions to be performed by the agent, a respective Q value that is an estimate of a return resulting from the agent performing the possible action in response to the current observation, and wherein selecting the action to be performed by the agent comprises: selecting an action having a highest Q value.

6. The system of claim 3, wherein the current action selection output identifies a best possible action to be performed by the agent in response to the current observation, and wherein selecting the action to be performed by the agent comprises: selecting the best possible action.

7. The system of claim 1, wherein the language encoder model is a recurrent neural network.

8. The system of claim 1, wherein the language encoder model is a bag-of-words encoder.

9. The system of claim 1, wherein the current text string is a natural language instruction for the agent for performing the current task.

10. The system of claim 1, wherein the current observation embedding is a feature matrix of the current observation, and wherein the current text embedding is a feature vector of the current text string.

11. The system of claim 10, wherein combining the current observation embedding and the current text embedding comprises:
flattening the feature matrix of the current observation; and
concatenating the flattened feature matrix and the feature vector of the current text string.

12. The system of claim 1, wherein the current text string is the same for each observation received during the performance of the current task.

13. The system of claim 1, wherein the current text string is different from a preceding text string received during the performance of the current task.

14. A method of training a language encoder model, an observation encoder neural network, and an action selection neural network that are used to select actions to be performed by an agent interacting with an environment, the method comprising:
receiving a current text string in a particular natural language that expresses information about a current task currently being performed by the agent;
providing the current text string as input to the language encoder model to obtain a current text embedding of the current text string;
receiving a current observation characterizing a current state of the environment;
providing the current observation as input to the observation encoder neural network to obtain a current observation embedding of the current observation;
combining the current observation embedding and the current text embedding to generate a current combined embedding;
selecting, using the current combined embedding, an current action to be performed by the agent in response to the current observation;
receiving a current reward as a result of the agent performing the current action in response to the current observation;
determining a task-specific update to current values of parameters of the action selection neural network by performing an iteration of a machine learning training technique to optimize a task-specific objective that is based on the current reward; and
determining a task-specific update to current values of parameters of the language encoder model and the observation encoder neural network by backpropagating gradients of the task-specific objective through the action selection neural network and into the language encoder model and the observation encoder neural network.

15. The method of claim 14, wherein the task-specific objective is to maximize a time-discounted expected return received in response to actions performed by the agent during performance of the current task, and wherein performing the iteration of the machine learning training technique comprises performing an iteration of a reinforcement learning technique to optimize the task-specific objective using the current reward and the current action selection output.

16. The method claim 14, wherein the current action selection output further comprises a predicted expected return output that is an estimate of a time-discounted return resulting from the environment being in the current state, and wherein performing the iteration of the reinforcement learning technique comprises performing an iteration of an actor-critic technique.

17. The method of claim 14, further comprising:
determining one or more auxiliary outputs using the current observation embedding, the current text embedding, or both; and
determining an auxiliary update to current values of parameters of the language encoder model, the observation encoder neural network, and the action selection neural network by performing an iteration of the machine learning training technique to optimize an auxiliary objective that is based on the one or more auxiliary outputs.

18. The method of claim 17, wherein determining the one or more auxiliary outputs comprises:
predicting a next observation to be received after the agent performs the selected action using a temporal autoencoder neural network that receives as input an embedding of the selected action and the current observation embedding.

19. The method of claim 18, wherein determining the auxiliary update comprises:
obtaining an actual next observation; and
determining an update to the current values of the parameters of the observation encoding neural network by performing an iteration of gradient descent to minimize a loss between the actual next observation and the predicted next observation.

20. The method of claim 19, wherein the temporal autoencoder neural network shares one or more parameters with the action selection neural network, and wherein determining the auxiliary update further comprises determining an update to the current values of the shared parameters.

21. The method of claim 17, wherein determining the one or more auxiliary outputs comprises:
obtaining data identifying a meaningful word, wherein the meaningful word is a word in the current text string that affects performance of the current task by the agent; and
processing the current observation using a language prediction neural network that shares at least some parameters with the observation encoding neural network to generate a probability distribution over a vocabulary of words, wherein the probability for each word represents a likelihood that the word should be the meaningful word.

22. The method of claim 21, wherein determining the auxiliary update comprises:
determining an update to the current values of the parameters of the observation encoding neural network by performing an iteration of gradient descent to minimize a negative log likelihood of the probability for the determined meaningful word.

23. The method of claim 17, wherein determining the one or more auxiliary outputs further comprises:

processing an intermediate output of the action selection neural network using a reward prediction neural network that is configured to generate a predicted reward that is an estimate of a reward that will be received as a result of the agent performing the current action in response to the current observation.

24. The method of claim 23, wherein determining the auxiliary update comprises:
determining an update to current values of parameters of the language encoder model, the observation encoder neural network, and the action selection neural network by performing an iteration of gradient descent to minimize a loss between the predicted reward and the current reward.

25. The method of claim 17, wherein the current action selection output further comprises a predicted expected return output that is an estimate of a time-discounted return resulting from the environment being in the current state, wherein determining the one or more auxiliary outputs further comprises:
re-sampling a recent observation and a recent text embedding from a replay memory, and
processing the recent observation and the recent text embedding to generate a predicted expected return output for the recent observation and the recent text embedding.

26. The method of claim 25, wherein determining the auxiliary update comprises:
determining an update to current values of parameters of the language encoder model, the observation encoder neural network, and the action selection neural network by performing an iteration of value function regression using the predicted expected return for the recent observation and the recent text embedding.

27. A method performed by one or more data processing apparatus for selecting actions to be performed by an agent interacting with an environment, the method comprising:
receiving a current text string in a particular natural language that expresses information about a current task currently being performed by the agent;
providing the current text string as input to a language encoder model to obtain a current text embedding of the current text string, wherein the language encoder model is configured to:
receive an input text string in the particular natural language, and
process the input text string to generate a text embedding of the input text string;
receiving a current observation characterizing a current state of the environment;
providing the current observation as input to an observation encoder neural network to obtain a current observation embedding of the current observation, wherein the observation encoder neural network is configured to:
receive an input observation characterizing a state of the environment, and
process the input observation to generate an observation embedding of the input observation;
combining the current observation embedding and the current text embedding to generate a current combined embedding; and
selecting, using the current combined embedding, an action to be performed by the agent in response to the current observation.

28. One or more non-transitory computer storage media storing instructions that when executed by one or more computers cause the one or more computers to perform operations for selecting actions to be performed by an agent interacting with an environment, the operations comprising:
receiving a current text string in a particular natural language that expresses information about a current task currently being performed by the agent;
providing the current text string as input to a language encoder model to obtain a current text embedding of the current text string, wherein the language encoder model is configured to:
receive an input text string in the particular natural language, and
process the input text string to generate a text embedding of the input text string;
receiving a current observation characterizing a current state of the environment;
providing the current observation as input to an observation encoder neural network to obtain a current observation embedding of the current observation, wherein the observation encoder neural network is configured to:
receive an input observation characterizing a state of the environment, and
process the input observation to generate an observation embedding of the input observation;
combining the current observation embedding and the current text embedding to generate a current combined embedding; and
selecting, using the current combined embedding, an action to be performed by the agent in response to the current observation.

* * * * *